Feb. 17, 1953           L. C. MITCHAM          2,628,868
GARDEN HOSE NOZZLE DEVICE
Filed April 10, 1951
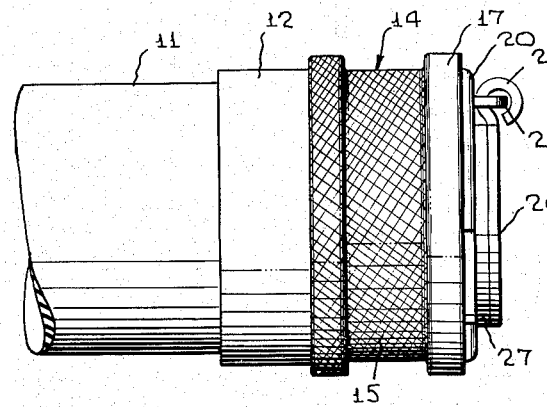
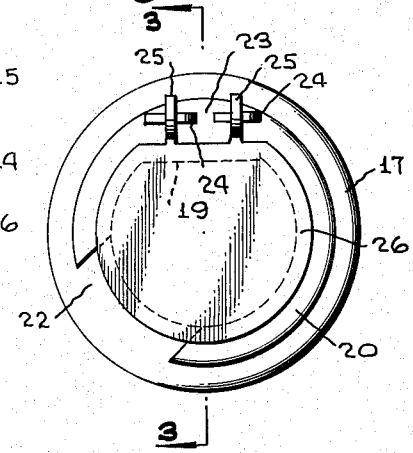
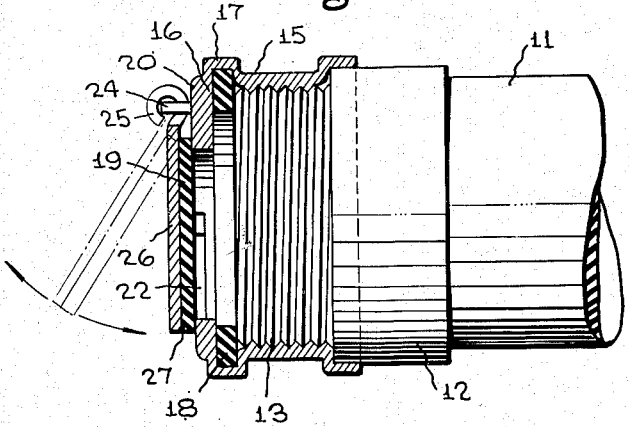
*INVENTOR.*
LAWRENCE C. MITCHAM
BY
McMorrow, Berman + Davidson
ATTORNEYS Patented Feb. 17, 1953

2,628,868

UNITED STATES PATENT OFFICE 2,628,868

GARDEN HOSE NOZZLE DEVICE

Lawrence C. Mitcham, Savannah, Ga.

Application April 10, 1951, Serial No. 220,204

2 Claims. (Cl. 299—123)

This invention relates to nozzle devices, and more particularly to an improved garden hose nozzle.

A main object of the invention is to provide a novel and improved garden hose nozzle device which may be employed to provide either free flow of water therethrough or to provide a spraying action by the use of manual force on the movable flap element of the device, said device being simple in construction, being easy to install on a conventional garden hose, and being easy to operate.

A further object of the invention is to provide an improved garden hose spray nozzle which permits free flow of water from the hose when the hose is laid down and which may be readily manipulated to provide a water spray by merely applying thumb pressure to the movable flap element of the device, said device being inexpensive to manufacture, being rugged in construction, and involving only a few parts.

Further objects and advantages of the invention will become apparent from the following description and claims, and from the accompanying drawings, wherein:

Figure 1 is a side elevational view of the end of a garden hose equipped with an improved spray device according to the present invention, said spray device being shown with the movable flap element thereof in closed position;

Figure 2 is an end elevational view of the spray device of Figure 1;

Figure 3 is a cross-sectional view taken on the line 3—3 of Figure 2.

Referring to the drawings, 11 designates a conventional garden hose having the end fitting 12, said fitting being provided with the externally threaded portion 13. Designated generally at 14 is an improved spray device constructed in accordance with the present invention, said device comprising a cap 15 formed with internal threads engageable with the external threads 13 of the hose fitting 12 in the manner shown in Figure 3. The cap 15 is formed adjacent its end wall with an annular corrugation 17 in which is received the annular gasket 18, said gasket being clamped against the end wall of the cap when said cap is tightened on the fitting 12. The end wall of the cap is designated at 16 and is formed with a generally circular aperture 19. Integrally formed on said end wall 16 around the aperture 19 is a generally C-shaped rib 20 whose open portion defines a laterally directed slot 22. Integrally formed on a thickened portion 23 of the rib 20 are the spaced apertured lugs 24, 24, and engaged in said lugs are the eye elements 25, 25 carried by a flap member 26 which is shaped to overlie the rib 20 and to substantially cover the aperture 19, as shown in Figure 3. Secured to the inner surface of the flap member 26 is the rubber gasket 27 adapted to engage the rib 20, as shown, whereby the aforementioned slot 22 is defined by the open portion of the rib, said slot 22 extending laterally with respect to the cap member 15.

In using the device, the cap member is engaged on the end of the hose fitting 12 in the manner illustrated in Figure 3. When the hose is not being employed for spraying, it may be laid down, and the flap member 26 is free to open under the pressure of the water flowing through the hose and to allow substantially free flow of said water, whereby the flow of water is not concentrated, as in the case of a conventional nozzle, and whereby the freely flowing water will not wash up small plants. When it is desired to obtain a water spray, the user merely picks up the end of the hose and applies thumb pressure against the flap 26, holding said flap in the position thereof shown in Figure 3, whereby the water is forced to flow outwardly and laterally through the slot 22. This provides a concentrated spray whose force may be regulated to some degree by regulating the thumb pressure applied against the flap 26.

While a specific embodiment of an improved garden hose nozzle device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A garden hose spray device comprising an internally threaded cap member engageable with an externally threaded hose fitting, said cap member being formed with an aperture in its end wall, a C-shaped peripheral rib on said end wall around said aperture, and a cover hinged to an intermediate portion of said rib and arranged to make sealing contact therewith, the open portion of the rib being located opposite the hinge connection of the cover and defining a laterally opening slot when the cover is in sealing position, said cover being free to swing open under water pressure to allow free flow through the aperture and providing a laterally directed water spray when held closed.

2. A garden hose spray nozzle device comprising an internally threaded cap member engageable with an externally threaded hose fitting, said cap member being formed with an aperture in its end wall, a C-shaped peripheral rib on said end wall around said aperture, a cover hinged to an intermediate portion of said rib, and a resilient sealing gasket on the inner surface of said cover arranged to make sealing contact with the rib, the open portion of the rib being located substantially opposite the hinge connection of the cover and defining a laterally opening slot when the cover is in sealing position, said cover being free to swing open under water pressure to allow free flow through the aperture and providing a laterally directed water spray when held closed.

LAWRENCE C. MITCHAM.

REFERENCES CITED

The following references are of record in the file of this patent:

UNITED STATES PATENTS

| Number | Name | Date |
|---|---|---|
| 635,379 | Golding | Oct. 24, 1899 |
| 1,033,688 | Fuchs | July 23, 1912 |
| 2,069,371 | Klein | Feb. 2, 1937 |